Figure 1:
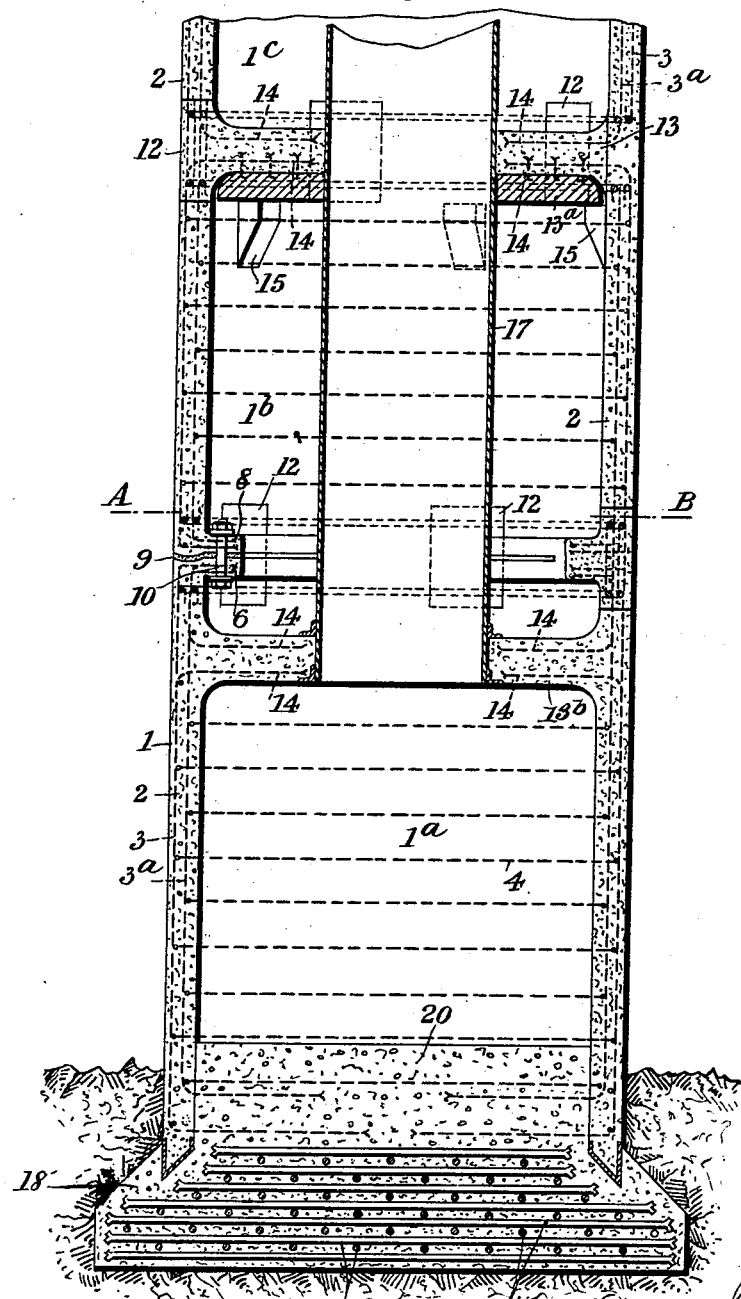

No. 676,568. Patented June 18, 1901.
G. L. MOUCHEL.
BUILDING BLOCK.
(Application filed Aug. 8, 1900.)
(No Model.) 9 Sheets—Sheet 1.

No. 676,568. Patented June 18, 1901.
G. L. MOUCHEL.
BUILDING BLOCK.
Application filed Aug. 8, 1900.

(No Model.) 9 Sheets—Sheet 2.

No. 676,568. Patented June 18, 1901.
G. L. MOUCHEL.
BUILDING BLOCK.
(Application filed Aug. 8, 1900.)
(No Model.) 9 Sheets—Sheet 3.

Witnesses:
Thomas F. Wallace
René Bruine

Inventor:
Gustave Louis Mouchel
By his Attorneys
Arthur C. Fraser & Co.

THE NORRIS PETERS CO., PHOTO-LITHO., WASHINGTON, D. C.

No. 676,568. Patented June 18, 1901.
G. L. MOUCHEL.
BUILDING BLOCK.
(Application filed Aug. 8, 1900.)

(No Model.) 9 Sheets—Sheet 4.

No. 676,568. Patented June 18, 1901.
G. L. MOUCHEL.
BUILDING BLOCK.
(Application filed Aug. 8, 1900.)
(No Model.) 9 Sheets—Sheet 5.

Witnesses:
Thomas F. Wallace
René Bruine

Inventor
Gustave Louis Mouchel
By his Attorneys
Arthur C. Fraser & Co.

No. 676,568. Patented June 18, 1901.
G. L. MOUCHEL.
BUILDING BLOCK.
(Application filed Aug. 8, 1900.)

(No Model.) 9 Sheets—Sheet 6.

No. 676,568. Patented June 18, 1901.
G. L. MOUCHEL.
BUILDING BLOCK.
(Application filed Aug. 8, 1900.)
(No Model.) 9 Sheets—Sheet 7.
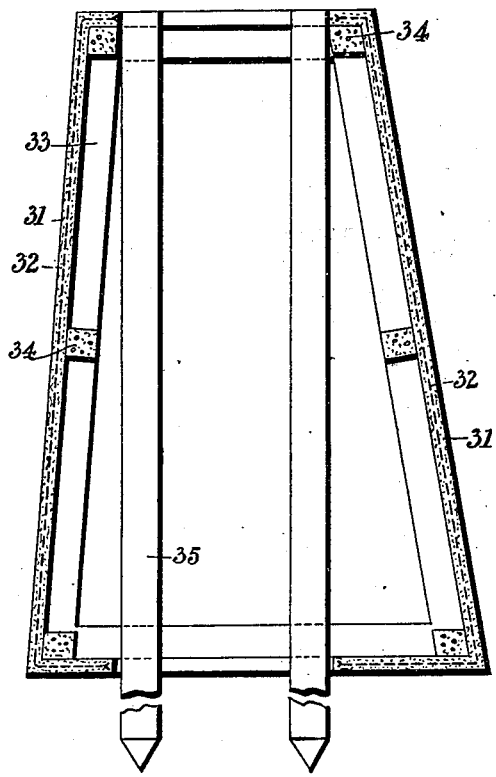
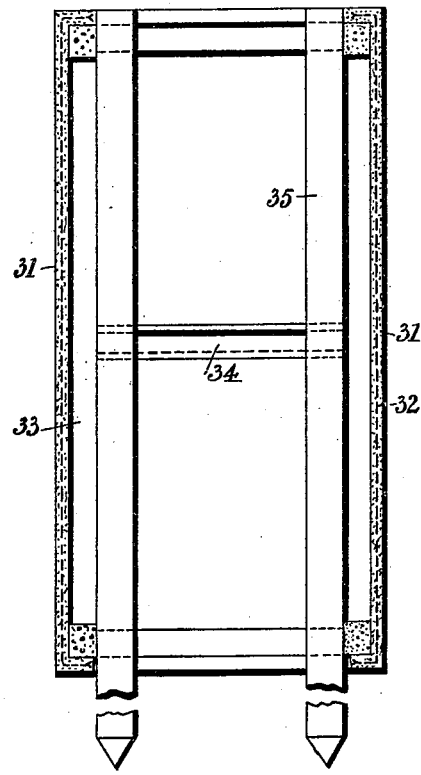
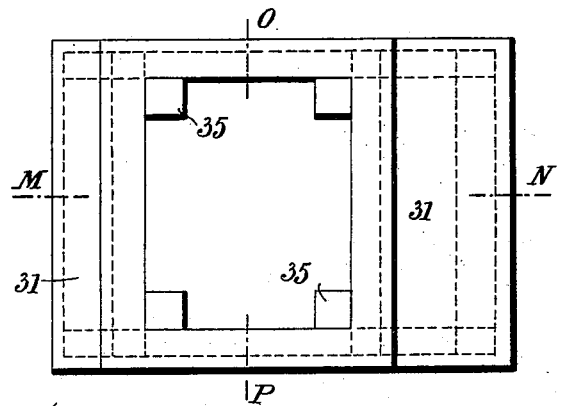

No. 676,568. Patented June 18, 1901.
G. L. MOUCHEL.
BUILDING BLOCK.
(Application filed Aug. 8, 1900.)
(No Model.) 9 Sheets—Sheet 8.

Witnesses:
Thomas T. Wallace,
René Bruine

Inventor
Gustave Louis Mouchel,
By his Attorneys,
Arthur C. Fraser & Co.

No. 676,568. Patented June 18, 1901.
G. L. MOUCHEL.
BUILDING BLOCK.
(Application filed Aug. 8, 1900.)

(No Model.) 9 Sheets—Sheet 9.

WITNESSES:
Fred White
Philip Comstock

INVENTOR:
Gustave Louis Mouchel,
By his Attorneys:

UNITED STATES PATENT OFFICE.

GUSTAVE LOUIS MOUCHEL, OF LONDON, ENGLAND.

BUILDING-BLOCK.

SPECIFICATION forming part of Letters Patent No. 676,568, dated June 18, 1901.

Application filed August 8, 1900. Serial No. 26,248. (No model.)

*To all whom it may concern:*

Be it known that I, GUSTAVE LOUIS MOUCHEL, engineer, of 124 Holborn, London, England, have invented certain new and useful Improvements in Building-Blocks, of which the following is a specification.

This invention relates to improved building-blocks for use as or in the construction of caissons, piers, coffer-dams, sea-walls, retaining-walls, quay-walls, dock-walls, jetties, breakwaters, well and pit linings, foundation-cylinders, and analogous structures.

According to this invention the improved building-blocks are constructed hollow and are composed of a comparatively thin shell or skin of concrete rammed or molded around and in between a rigid strengthening metal skeleton or framework consisting of practically rigid iron or steel bars strutted, tied, and braced together so as to render the rigidity of said skeleton independent of the rigidity of the concrete in which it is embedded.

These building-blocks are made of the shape suited to the object in view. For example, in the case of caissons, piers, well and pit linings, foundation-cylinders, and the like they are preferably made of cylindrical form. In the case of coffer-dams, sea-walls, retaining-walls, quay-walls, dock-walls, jetties, breakwaters, and the like they are made, preferably, of rectangular form in horizontal cross-section and of the contour in vertical cross-section of the wall or the like to be erected.

Building-blocks according to this invention may be formed with strengthening-diaphragms or other supporting-framework composed of concrete, having a rigid metal skeleton embedded therein. In some cases a supporting-framework of timber is erected inside the block for the purpose of supporting the walls of the latter during the setting of the concrete. The building-blocks may be left hollow after erection or they may be filled with poor concrete or other composition or with gravel, sand, or stones.

As the blocks are hollow, they can be constructed at a convenient spot ashore, whence they can be conveyed on rafts or may be floated to their permanent location, where they are sunk and filled with poor concrete.

Whenever it is found necessary to hold the blocks in position on bad foundations or in stormy waters or strong currents, they are anchored by driving piles, which hold them in position.

Figure 2:
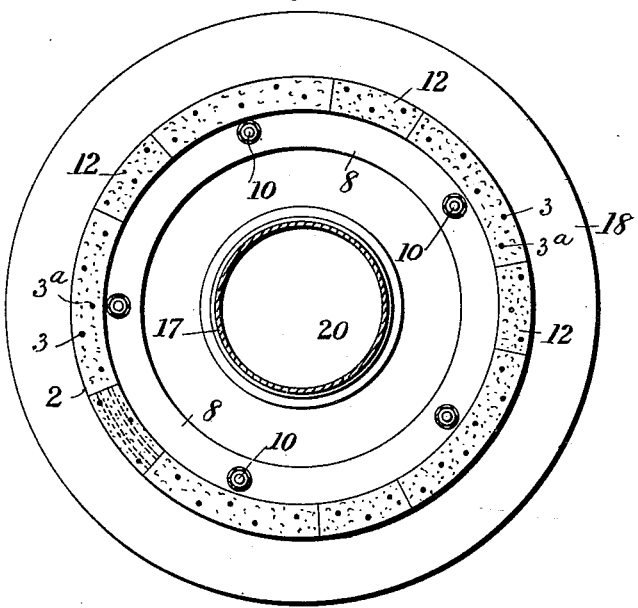
Figure 3:
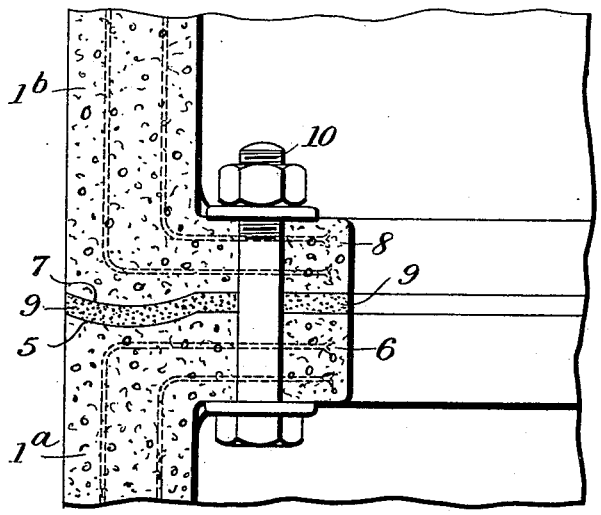
Figures 4, 5, 6:
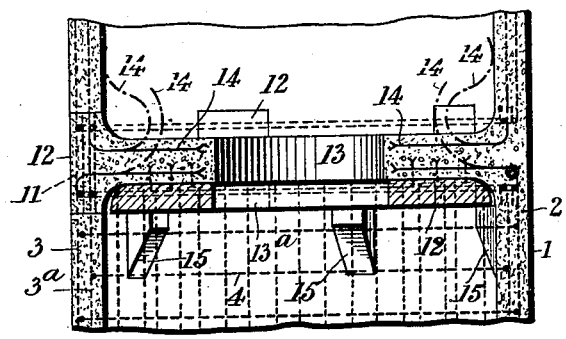
Figure 7:
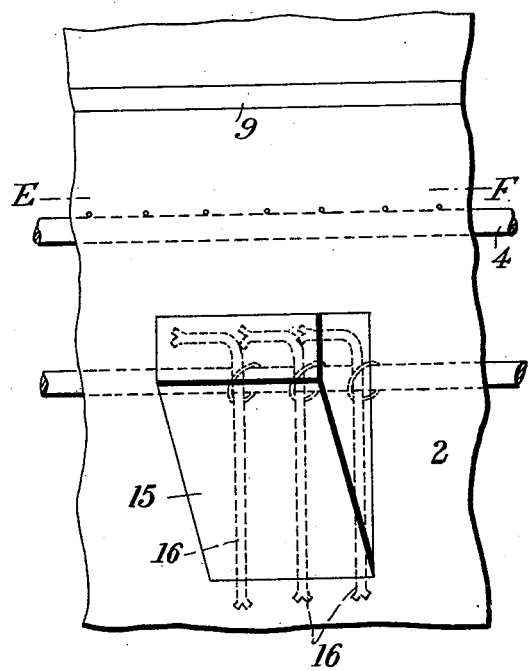
Figure 8:
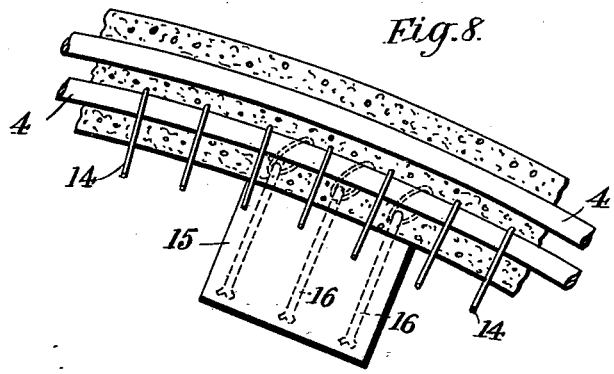
Figure 9:
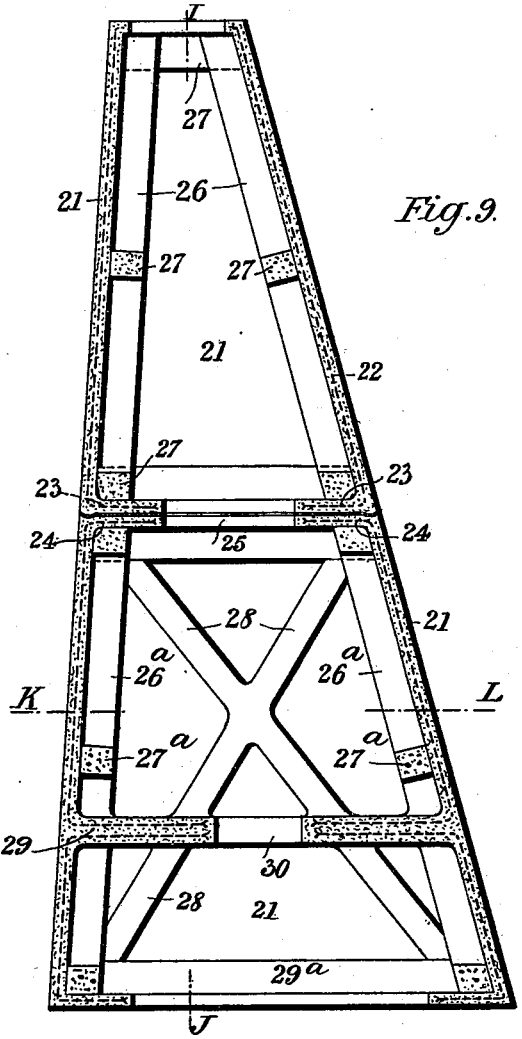
Figure 11:
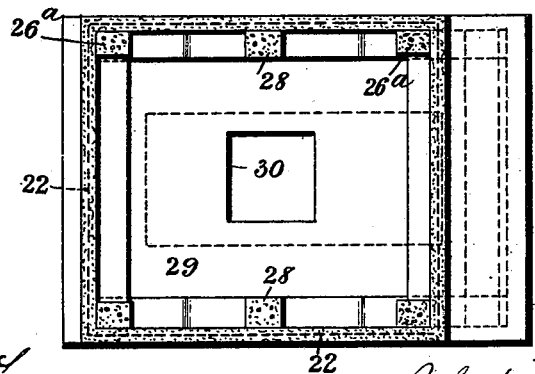
Figure 10:
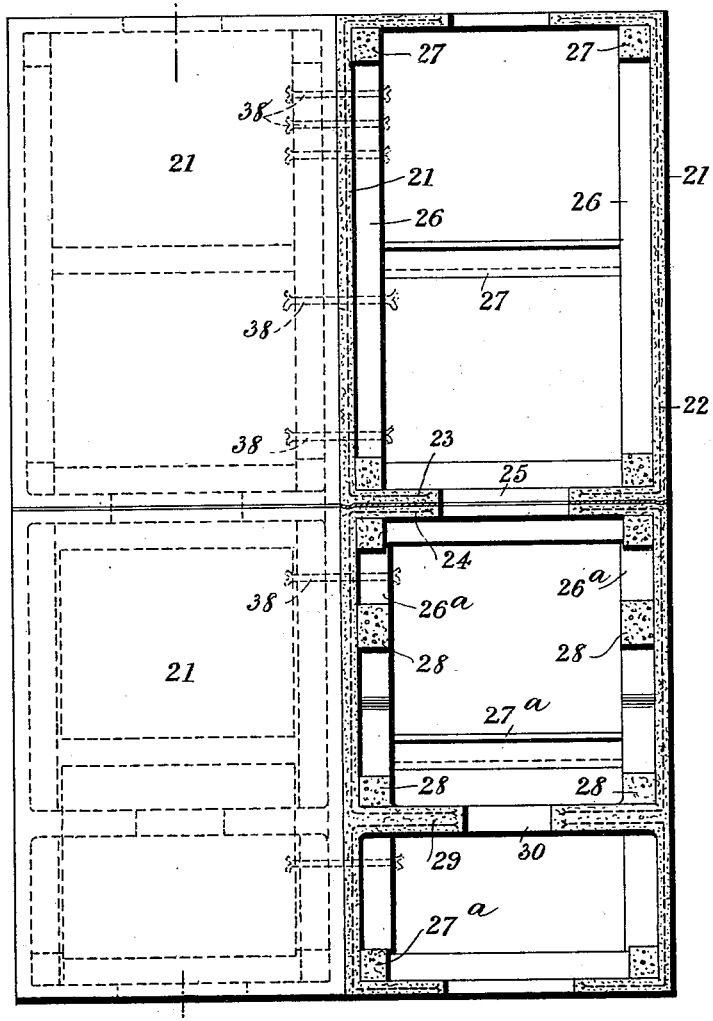
Figure 15:
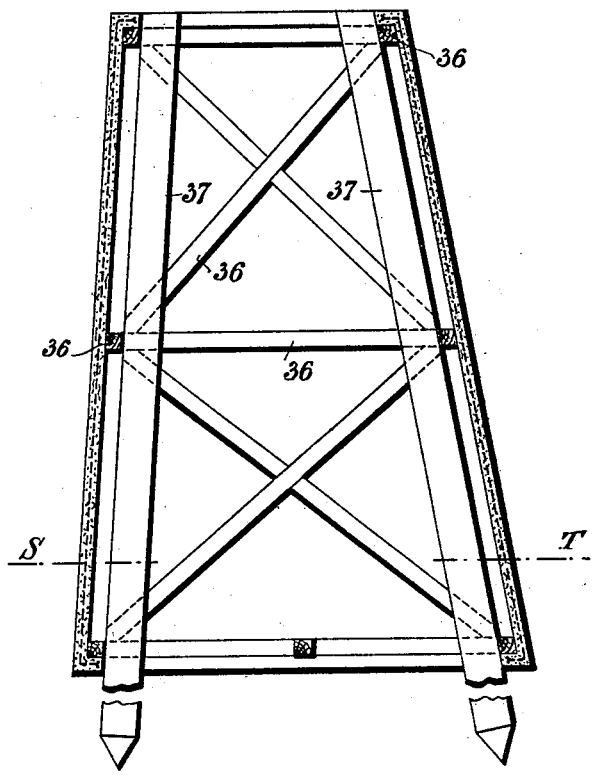
Figure 16:
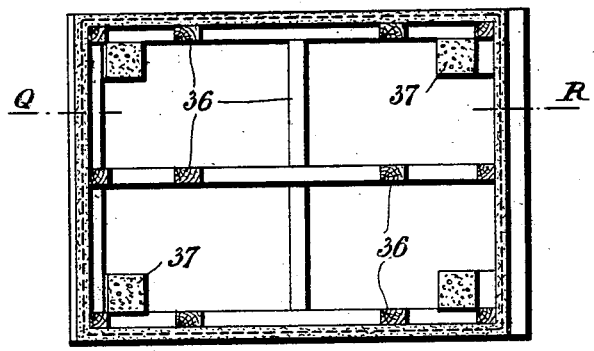
Figure 17:
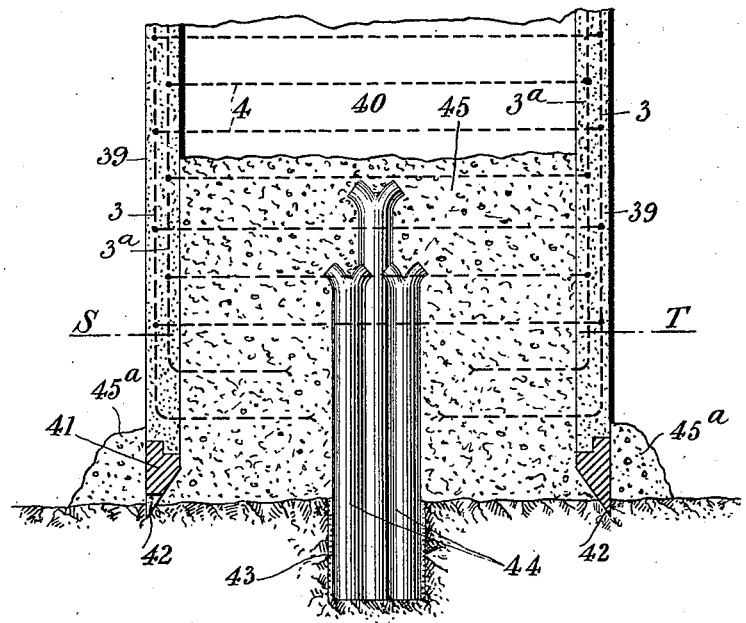
Figure 18:
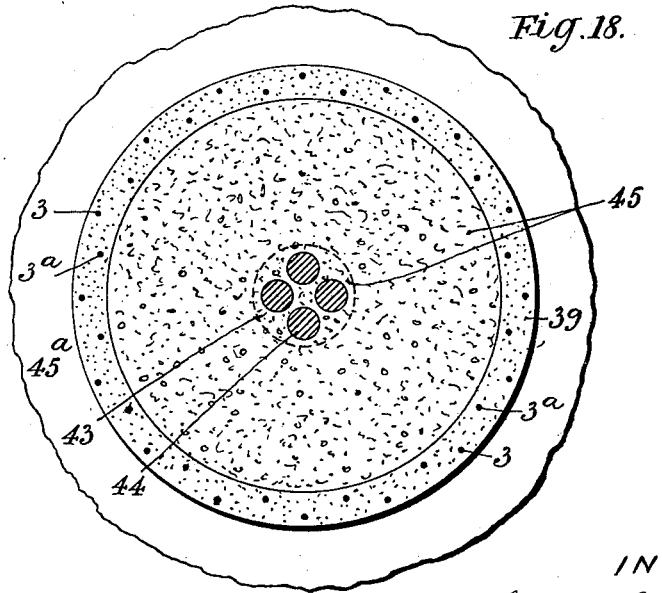

In the accompanying drawings, Figure 1 is a central vertical section of a foundation-block of cylindrical form. Fig. 2 is a horizontal cross-section on the line A B of Fig. 1. Figs. 3, 4, 5, 6, 7, and 8 are separate views illustrating the construction of the horizontal joints. Figs. 3, 5, 6, 7, and 8 are drawn to a larger scale than Figs. 1, 2, and 4. Fig. 5 is an elevation, and Fig. 6 a horizontal section, on the line C D of Fig. 5, showing the joint before filling up with concrete; and Fig. 7 is an elevation, and Fig. 8 a horizontal section, on the line E F, showing the joint filled up with concrete. Figs. 9, 10, and 11 illustrate blocks for quay-walls and the like. Fig. 9 is a vertical cross-section on the line G H of Fig. 10. Fig. 10 represents as to its left-hand half a rear elevation of one block and as to its right-hand half a vertical longitudinal section on the line I J of Fig. 9 of an adjacent block, and Fig. 11 is a horizontal section on the line K L of Fig. 9. Figs. 12, 13, and 14 show a block retained in position by piles. Fig. 12 is a vertical section on the line M N of Fig. 14. Fig. 13 is a vertical cross-section on the line O P of Fig. 14, and Fig. 14 is a plan. Figs. 15 and 16 shows a block with a supporting-framework of timber. Fig. 15 is a vertical section, and Fig. 16 is a horizontal cross-section, on the line Q R of Fig. 15. Fig. 17 is a vertical section, and Fig. 18 is a horizontal cross-section, on the line S T of Fig. 17, showing a modification.

Referring first to Figs. 1 to 8, inclusive, 1 is the hollow building-block, composed of consecutive lengths $1^a$ $1^b$ $1^c$, each consisting of a thin shell of concrete 2, rammed or molded around and in between the members of a rigid strengthening metal skeleton composed of practically rigid vertical bars 3 and horizontal bars 4, of iron or steel, of any suitable section. The upper end of the length $1^a$ is made with a concave surface 5 and with a peripheral inwardly-projecting flange 6, and the length $1^b$ is made with a convex surface 7, of corresponding curvature to the surface 5, and with a flange 8, corresponding to the flange 6. Grout 9 is poured into the space between the ends of the two lengths to make a water-tight joint, which is further secured by bolts 10, passing through the two flanges 6 and 8. (Shown more clearly in Fig. 3.) In molding each length the inner metal framework is left bare at certain places around the periphery of the ends of the cylinders in such a manner that these bare places will correspond exactly on the edges of the two adjacent lengths. 11 represents metal loops or straps looped around and connecting together the lower horizontal member 4 of the metal skeleton of the upper section, with the upper horizontal member 4 of the metal skeleton of the lower section. The space around and between the bare places above referred to is then filled up tightly with quick-setting concrete or grout 12 to complete the joint and make it perfectly water-tight. The bare spaces to be filled with concrete 12 extend through the flanges 6 and 8, which are interrupted at those places. In filling up the said spaces with concrete 12 the connecting-flanges 6 and 8 are continued across the said spaces and molded in one piece with the fillings 12, so that there is no cement joint 9 at those places between the connecting-flanges, which at said places are made integral with each other and with the fillings 12, as shown in the lowest joint. The fillings 12 are intended to form a secure bond between adjacent shells. Those joints of the building-block which are liable to be subjected to great pressure of air or water—as, for instance, in a water-bearing stratum—are made as I shall now describe with reference to the upper joint of the block (shown in Figs. 1 and 4,) connecting the adjacent shells $1^b$ $1^c$ together. These shells are placed end to end, with their peripheral jointing edges together and with a cement joint 9 between same. Then the bare spaces are filled with concrete 12, and an annular stiffening-diaphragm 13 (which may be considered as being composed of two connecting-flanges 6 and 8, molded in one piece with each other) is molded around the inside of the joint in one piece with the fillings 12 in the two connected shells $1^b$ and $1^c$ and preferably also in one piece with the concrete of the connected shells. The stiffening-diaphragm 13 serves not only to strengthen the block of the joint, but it also serves to prevent effectually all leakage of air and water through the cement joint 9. Diaphragms of this kind extend across the same from wall to wall. These diaphragms are constructed as follows: At the place selected some of the vertical members $3^a$ of the shell are extended to form extensions 14, bent horizontally inward all around the periphery of the block to a suitable distance toward the center. Then concrete is rammed around and between said extensions 14, so as to form the horizontal diaphragm 13, which is thereby strengthened by the metallic skeleton 14. To aid in ramming the diaphragms 13, brackets 15, having a strengthening-skeleton 16, are formed in one with the shell of the block. These brackets serve to carry the platform $13^a$, upon which the concrete is rammed to form the diaphragm 13. Fig. 4 illustrates the manner in which the metal extensions 14 are bent up out of the way, as shown in dotted lines, while the first layers of concrete are being rammed. The extensions are then laid horizontally upon the concrete in their order, as shown in full lines, interlaced with stiffening members and covered over with concrete to complete the diaphragm. The building block or cylinder 1 is also strengthened and stiffened by means of horizontal diaphragms $13^b$, which extend wholly or partly across the cavity of the block and which are constructed in a similar manner to the diaphragms 13, above referred to. 17 is a sheet-metal tube extending from the bottom length $1^a$ to near or beyond the top of the block. It opens through the lowermost diaphragm of the bottom length into the latter and is fitted with an air-lock at its upper end, whereby compressed air can be admitted and discharged from the said bottom length and whereby workmen and materials can be admitted to and passed out of the same for the purpose now about to be described. When the block has been sunk to the desired depth, a lateral excavation of greater diameter than the foot of the block is made around the same, into which is built up a monolithic floor or slab composed of alternate layers of concrete 18 and horizontal frameworks or webs of metal 19. This provides a large base for the block and distributes the weight over a wide area. The block is then filled up to a certain height with concrete 20.

Referring to Figs. 9, 10, and 11, each block extends the entire height of the quay-wall and is composed of two sections connected together with a horizontal joint situated about half-way up the wall. Each section consists of a thin shell of concrete 21, in which is embedded a rigid strengthening metal skeleton 22. The horizontal joint between the bottom 23 of the upper section and the top 24 of the lower section is formed by grouting the two together. 25 is an aperture formed in the parts 23 and 24. The shell of the upper section is strengthened against bulging and caving in by means of an inside framework composed of vertical beams 26 and horizontal beams 27, of metal and concrete, and the shell of the lower section is similarly strengthened by means of vertical beams $26^a$ and horizontal beams $27^a$, of metal and concrete. The shell of the lower section is additionally strengthened by means of diagonal beams 28, of concrete. A horizontal diaphragm 29, of concrete, having a rigid strengthening metal skeleton embedded in it, extends across the lower section. It is formed with an aperture 30, through which access can be had for excavating the ground underneath the block under compressed air.

Referring to Figs. 12, 13, and 14, the block is made in one piece and has a shell 31, of concrete, strengthened by means of an internal rigid metal skeleton 32. 33 and 34 are respectively vertical and horizontal beams, of concrete, for preventing the walls of the shell from caving in from the pressure of the surrounding medium during the filling of the block with poor concrete. 35 represents piles driven at the corners of the block into the ground to anchor the block in position.

In the block shown in Figs. 15 and 16 a removable framework 36, of timber, is erected inside the block to support the shell. 37 represents piles driven at the corners of the block to keep it in position.

As a rule it is necessary to make a quay-wall monolithic. To insure that result with blocks constructed according to my invention, it is sufficient to bring them as near to each other as possible. Then through the adjacent walls of two consecutive blocks before they are filled up there are passed a suitable number of metal rods or bars 38 or the like, Fig. 10, the ends of which become embedded in the concrete which fills up the two blocks, and the space between such consecutive two blocks is filled up with the concrete. This may be effected by means of a shuttering at front and back of the blocks, which shuttering is left in position until the concrete has set. Concrete blocks for quay-walls, &c., are generally made of concrete run in a box or mold, which is afterward removed. As a rule the concrete is more or less liquid when shot in the box and is rarely, if ever, pressed at all. The result is a block which is rarely quite dry and set when immersed and which contains a great many cavities or crevices that multiply the points of contact of the concrete with the water in which it is immersed. This explains the complaints made of the action of water upon the concrete. By making the concrete with a minimum of moisture and carefully pressing it in the molding of the block and then allowing the block to become completely set before use the result is much better so far as the action of sea-water is concerned. Now according to this invention a hollow block is made of a shell of concrete which has been well pressed and made a considerable time ahead, and consequently well set, so that the concrete is much closer grained than concrete made in the ordinary way. Consequently the action of the sea-water upon the block is *nil*, and being made of rich concrete the hollow block can safely be filled up with concrete poorer in cement than can be used ordinarily. The result is a combination of security against the pernicious action of sea-water with economy in total cost.

Figs. 17 and 18 show a method of applying this invention to blocks of large diameter which are intended to rest upon rocky ground and to be exposed to strong currents, such as the blocks forming the piers of bridges or the supports of sea-works having open-work understructures. As shown, I make a hollow block 39 of concrete, as above described, with a large central longitudinal cavity 40, and I arm the lower end thereof with a metal shoe 41, having a sharp serrated edge 42. The block having been brought centrally over the place which it is to occupy, it is lowered onto the rock, and by a few blows of a pile-driver or other suitable means the sharp edge 42 of the shoe is caused to penetrate a short distance—say a few inches—into the rock. Then a hole 42 is "jemped" or drilled to a suitable depth in the rock in a line with the central cavity 40 of the block, the drillings being removed through said cavity. A suitable number of iron or steel bars or rods 44 are then inserted through the said cavity into the said hole, these bars or rods being of such a length as to extend from the bottom of the hole 43 in the rock up to any suitable distance inside the central cavity 40 of the block 39. Grout or cement 45 is then poured into the central cavity to fill up the spaces around and in between the bars or rods 44 in the hole 43 in the rock and in the cavity 40 in the block. The bars or rods when thus grouted in will form a strong and rigid core or internal support for the block 39. Openings may be provided in the lower portion of the shell of the block to allow some of the grouting to exude onto the surface of the rock around the outside of the foot of the block, and thus to form a firm base or annular lateral support at the foot of the block.

By making the shoe 41 with a sharp serrated edge 42 the penetration of the shoe into the rock is facilitated, and if the serrations 42 are sufficiently deep the upper portions or spaces of the serrations will serve as the hereinbefore-mentioned openings for the exudation of the grouting around the foot of the block, as indicated at 45ᵃ.

The object of employing the sharp shoe is to enable the block to be held or fixed firmly in position during the drilling of the central hole in the rock for the metal core without any risk of the block being shifted by currents, &c.

This form of construction of block is of particular value in cases where the rocky ground is too hard to allow of driving piles shod with the ordinary pointed shoes to the depth necessary to afford the requisite bearing area.

The anchoring means shown in Figs. 12 to 16 may be used in addition to and in connection with those shown in Figs. 17 and 18.

What I claim, and desire to secure by Letters Patent, is—

1. In a building-block, a plurality of relatively thin shells arranged end to end, each shell being composed of concrete rammed around a rigid strengthening metal skeleton and having peripheral jointing edges at its ends, annular flanges near each end, cement filling the joint between the adjacent peripheral edges of consecutive shells, and means connecting together the adjacent annular flanges of consecutive shells, substantially as set forth.

2. In a building-block, a plurality of relatively thin shells arranged end to end, each shell being composed of concrete rammed or molded around a rigid strengthening metal skeleton, and having peripheral jointing edges at its ends, and a flange near each end composed of concrete molded integrally with the concrete of the shell and also integrally with a similar flange on the adjacent shell, whereby a stiffening and connecting diaphragm is formed at the joint so as to prevent all leakage of air and water through the joint, substantially as set forth.

3. In a building-block, a plurality of relatively thin shells arranged end to end, each shell being composed of concrete rammed or molded around a rigid strengthening metal skeleton and having peripheral jointing edges at its ends, and an inwardly-extending metal skeleton arranged near each end and connected to the metal skeleton of the shell, and concrete rammed or molded around and between the adjacent inwardly-extending metal skeletons of two consecutive shells and also molded integrally with the concrete of the said two consecutive shells, whereby a common stiffening and connecting diaphragm is formed at the joint of and integral with said two consecutive shells, substantially as set forth.

4. In a building-block, the combination of a relatively thin shell composed of concrete rammed or molded around a rigid strengthening metal skeleton, and an annular diaphragm arranged intermediately, and composed of concrete integral with the concrete of the shell, substantially as set forth.

5. In a building-block, the combination of a relatively thin shell composed of concrete rammed or molded around a rigid strengthening metal skeleton, and an annular diaphragm arranged intermediately and composed of concrete molded integrally with the shell and rammed around a rigid strengthening metal skeleton, substantially as set forth.

6. In a building-block, the combination of a relatively thin shell composed of concrete rammed or molded around a rigid strengthening metal skeleton, and an annular diaphragm arranged intermediately and composed of concrete molded integrally with the shell, and rammed around a rigid strengthening metal skeleton connected to the metal skeleton of the shell, substantially as set forth.

7. In a building-block, the combination of a relatively thin shell composed of concrete rammed or molded around a rigid strengthening metal skeleton, an annular diaphragm composed of concrete integral with the concrete of the shell, a molding floor or platform supporting said diaphragm during molding, and a plurality of supports for said platform, connected to the shell, substantially as set forth.

8. In a building-block, the combination of a relatively thin shell composed of concrete rammed or molded around a rigid strengthening metal skeleton, an annular diaphragm composed of concrete integral with the concrete of the shell, a molding floor or platform supporting said diaphragm during the molding, and a plurality of supports for said platform each composed of concrete integral with the concrete of the shell and molded around a rigid strengthening metal skeleton connected to the skeleton of the shell, substantially as set forth.

9. In a building-block, a plurality of relatively thin shells arranged end to end, each shell being composed of concrete rammed around a rigid strengthening metal skeleton and having a concave peripheral edge at one end and a convex peripheral edge at the other end, and an annular diaphragm near each end, cement filling the joint between the adjacent concave and convex peripheral edges of consecutive shells, and bolts connecting together the adjacent annular diaphragms of consecutive shells, substantially as set forth.

10. In a building-block a plurality of relatively thin shells arranged end to end, each shell consisting of concrete rammed around a rigid strengthening metal skeleton and having a concave peripheral edge at one end and a convex peripheral edge at the other end, and cavities at intervals around each end leaving the rigid skeleton bare at such places, cement filling the joint between the concave and convex peripheral edges of adjacent ends, concrete filling up the aforesaid cavities in adjacent ends, a rigid metal skeleton connected to the rigid skeleton of each shell, and a rigid metal skeleton connected to the metal skeleton of the adjacent shell, concrete rammed around and between the said metal skeletons and integral with the cement in the joint and with the concrete in the aforesaid cavities whereby a strengthening-diaphragm is formed at the joint of two consecutive shells, substantially as set forth.

11. In a building-block, the combination of a relatively thin shell composed of concrete rammed around a rigid strengthening metal skeleton, and a removable inner framework of beams supporting the walls of the said shell, substantially as set forth.

12. In a building-block, the combination of a relatively thin shell composed of concrete rammed around a rigid strengthening metal skeleton, and retaining-piles spaced around the periphery of the shell and driven through the said shell into the ground, substantially as set forth.

13. In a building-block, a plurality of relatively thin shells arranged side by side, each shell being composed of concrete rammed around a rigid strengthening metal skeleton, connecting metal bars extending through the adjacent side walls of adjacent shells, and concrete filling said adjacent shells and the space between said adjacent shells, and in which said metal bars extend and are rigidly held, substantially as set forth.

14. In a building-block, the combination of a relatively thin shell composed of concrete rammed around a rigid strengthening metal skeleton, a metal shoe having a serrated cutting edge mounted on the lower end of said shell, metal bars arranged within the cavity of said shell, and projecting beyond the cutting edge of the shoe, and cement concrete filling up the space around the said metal bars in said shell and exuding through the serrations of said shoe substantially as set forth.

In witness whereof I have hereunto signed my name in the presence of two subscribing witnesses.

GUSTAVE LOUIS MOUCHEL.

Witnesses:
GEORGE BELOE ELLIS,
ROBERT MILTON SPEARPOINT.